(12) United States Patent
Thompson et al.

(10) Patent No.: US 10,867,082 B2
(45) Date of Patent: Dec. 15, 2020

(54) PANEL-BASED LOCAL OPTIMIZATION OF PLY SEQUENCING

(71) Applicant: The Boeing Company, Chicago, IL (US)

(72) Inventors: Richard J. Thompson, Huntsville, AL (US); Adriana Willempje Blom-Schieber, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 383 days.

(21) Appl. No.: 15/923,712

(22) Filed: Mar. 16, 2018

(65) Prior Publication Data

US 2019/0286788 A1 Sep. 19, 2019

(51) Int. Cl.
| | |
|---|---|
| G06F 17/50 | (2006.01) |
| G06F 30/15 | (2020.01) |
| G06F 30/00 | (2020.01) |
| G06F 30/17 | (2020.01) |
| G06F 111/02 | (2020.01) |
| G06F 113/26 | (2020.01) |

(Continued)

(52) U.S. Cl.
CPC .............. *G06F 30/15* (2020.01); *G06F 30/00* (2020.01); *G06F 30/17* (2020.01); *G06F 2111/02* (2020.01); *G06F 2113/26* (2020.01); *G06F 2113/28* (2020.01); *G06F 2119/18* (2020.01)

(58) Field of Classification Search
CPC ......... B32B 5/26; B32B 2605/18; B32B 5/12; B32B 2262/106; B32B 2260/023; B32B 1/00; B32B 5/02; B32B 37/025; B32B 15/01; B32B 2250/20; B32B 7/05; B29C 70/38; B64F 5/00; G06F 17/50; G06F 19/00
See application file for complete search history.

(56) References Cited

U.S. PATENT DOCUMENTS

2007/0106418 A1* 5/2007 Hagen .................. B29C 70/386
700/186
2016/0052214 A1* 2/2016 Gilbert .................... B29C 70/38
700/33

(Continued)

FOREIGN PATENT DOCUMENTS

EP 3203395 A1 8/2017

OTHER PUBLICATIONS

Jing et al. A Framework for Design and Optimization of Tapered Composite Structures. Part II: Enhanced Design Framework With a Global Blending Model Composite Structures 188, pp. 531-552, available online Nov. 22, 2017 (Year: 2017).*

(Continued)

*Primary Examiner* — Rehana Perveen
*Assistant Examiner* — Cuong V Luu
(74) *Attorney, Agent, or Firm* — Duft & Bornsen, PC

(57) ABSTRACT

Systems and methods are provided for optimizing designs of composite parts. One embodiment is a method that includes identifying, at a controller, a candidate movement of a ply to a new ply position within a composite part, based on an objective function, loading, at the controller, stacking sequence rules that dictate how fibers are oriented across ply sequences of the composite part, and determining, at the controller, whether the candidate movement complies with the stacking sequence rules.

27 Claims, 12 Drawing Sheets

(51) Int. Cl.
G06F 113/28 (2020.01)
G06F 119/18 (2020.01)

(56) References Cited

U.S. PATENT DOCUMENTS

2017/0057666 A1* 3/2017 Blom .................. G06F 30/15
2019/0065629 A1* 2/2019 Phinney ............... G06F 30/00

OTHER PUBLICATIONS

Zein et al. A Bilevel Integer Programming Method for Blended Composite Structures Advances in Engineering Software 79, 2014 pp. 1-12 (Year: 2014).*
Kim et al. Practical Design of Tapered Composite Structures Using the Manufacturing Cost Concept Composite Structures 51, 2001, pp. 285-299 (Year: 2001).*
Jing et al. A Framework for Design and Optimization of Tapered Composite Structures. Part I: From Individual Panel to Global Blending Structure Composite Structures 154, 2016 pp. 106-128 (Year: 2016).*
Boyang Liu et al; Composite Wing Structural Design Optimization With Continuity Constraints; A01-25021; Seattle, WA; Apr. 2001.
Christos Kassapolglou; Composite plases with two concentric layups under compression; ScienceDirect; 2008.
David B. Adams et al; Global/Local Iteration for Blended Composite Laminate Panel Structure Optimization Subproblems.
Dianzi Liu et al; Optimization of Blended Composite Wing Panels Using Smeared Stiffness Technique and Lamination Parameters.
Dr. Scott W Beckwith; Designing with Composites: Suggested "Best Practices" Rules.
Graeme J. Kennedy; A Regularized Discrete Laminate Parametrization Technique with Applications to Wing-Box Design Optimization; AIAA 2012-1519.
M. Bruyneel; Stacking sequence optimization for constant stiffness laminates based on a continuous optimization approach; Structural & Multidisciplinary Optimization, 46(6), 783-794, 2012.
M. Giger et al; A graph-based parameterization concept for global laminate optimization; Structural and Multidisciplinary Optimization; Sep. 2008.
Omprakash Seresta et al; Optimal design of composite Wing Structures with Blended Laminates; AIAA 2004-4349.
Optimization of anisotropic composite panels with T-shaped stiffeners including transverse shear effects and out-of-plane loading; ResearchGate; Dec. 2008.
U.S. Appl. No. 14/836,333.
U.S. Appl. No. 14/836,369.
U.S. Appl. No. 15/399,104.
U.S. Appl. No. 15/399,187.
Van Campen et al; Blended Designs for Composite Plates With Two Concentric Lay-ups Under Compression; Delft University of Technology.
Van Campen et al; Optimum Lay-up Design of Variable Stiffness Composite Structures; 2011.
Yasser M. Meddaikar et al; Blended Composite Optimization combining Stacking Sequence Tables and a Modified Shepard's Method; Jun. 2015; Sydney Australia.
Dianzi Liu et al; Bilevel Optimization of Blended Composite Wing Panels; Journal of Aircraft; Jan. 1, 2011.
European Search Report; Application EP19154901; dated Aug. 14, 2019.
Macquart Terence; Future Research in Multi-step Composite Optimisation; Bristol University; Sep. 14, 2016.
Ming Zhou; A Comprehensive Process for Composite Design Optimisation; Altair; Dec. 31, 2009.

* cited by examiner

PANEL-BASED LOCAL OPTIMIZATION OF PLY SEQUENCING

FIELD

The disclosure relates to the field of composite part construction, and in particular, to designing composite parts (e.g., laminated composite parts).

BACKGROUND

For large composite parts that are divided into panels, the process of design is highly involved, because the number, fiber orientations and sequence of plies may vary from panel to panel within the composite part. Moreover, connectivity between plies in neighboring panels is desired to transfer loads between panels and to ensure efficient manufacturability, resulting in a complex problem of arranging plies spatially as well as through the thickness of the laminate. The process to design the ply patterns that maintain the intended strength and load carrying capability of the part becomes increasingly more complex for larger structures, such as wing skins. Therefore, it would be desirable to have a method and apparatus that take into account at least some of the issues discussed above, as well as other possible issues.

SUMMARY

Embodiments described herein provide techniques for optimizing designs for multi-layer, multi-panel composite parts. These techniques utilize local optimization of stacking sequences to ensure not only that a part is designed with desired strength, but also that the part may be manufactured efficiently by an Automated Fiber Placement (AFP) machine, an Automated Tape Laying (ATL) machine, pick-and-place techniques, or even hand layup. These techniques may also help to provide improvements to composite designs that have already been optimized or only partially optimized via global techniques, such as integer programming techniques.

One embodiment is a method that includes identifying, at a controller, a candidate movement of a ply to a new ply position within a composite part, based on an objective function, loading, at the controller, stacking sequence rules that dictate how fibers are oriented across ply sequences of the composite part, and determining, at the controller, whether the candidate movement complies with the stacking sequence rules.

A further embodiment is a method that includes determining a cost indicated by an objective function for a current laminate design for a composite part, selecting a sequence with an empty ply position of the laminate design having a same orientation as a ply within the laminate design, determining a change in cost for the laminate design if the ply was moved to the sequence with the empty ply position, and reporting the movement of the ply to the sequence with the empty ply position as a candidate move if the cost for the laminate design would be reduced.

A further embodiment is a non-transitory computer readable medium embodying programmed instructions which, when executed by a processor, are operable for performing a method. The method includes identifying, at a controller, a candidate movement of a ply to a new ply position within a composite part, based on an objective function, loading, at the controller, stacking sequence rules that dictate how fibers are oriented across ply sequences of the composite part, and determining, at the controller, whether the candidate movement complies with the stacking sequence rules.

A further embodiment is a system that includes an interface that receives a laminate design defining an arrangement of plies for a composite part, the laminate design subdividing the composite part into panels that are positioned at distinct surface locations at the composite part, each panel including layers that are positioned at distinct depths at the composite part. The system also includes a controller that selects an objective function for scoring the laminate design that is based on manufacturing speed for the laminate design, selects a ply located at a ply position in the laminate design, each ply position in the stacking sequence occupying a ply sequence, and identifies a candidate movement of the ply to a new ply position, based on the objective function. The controller loads stacking sequence rules that dictate how fibers are oriented across the ply sequences of the composite part, determines whether the candidate movement complies with the stacking sequence rules, performs the candidate movement when the candidate movement complies with the stacking sequence rules, and prevents the candidate movement when the candidate movement violates the stacking sequence rules.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
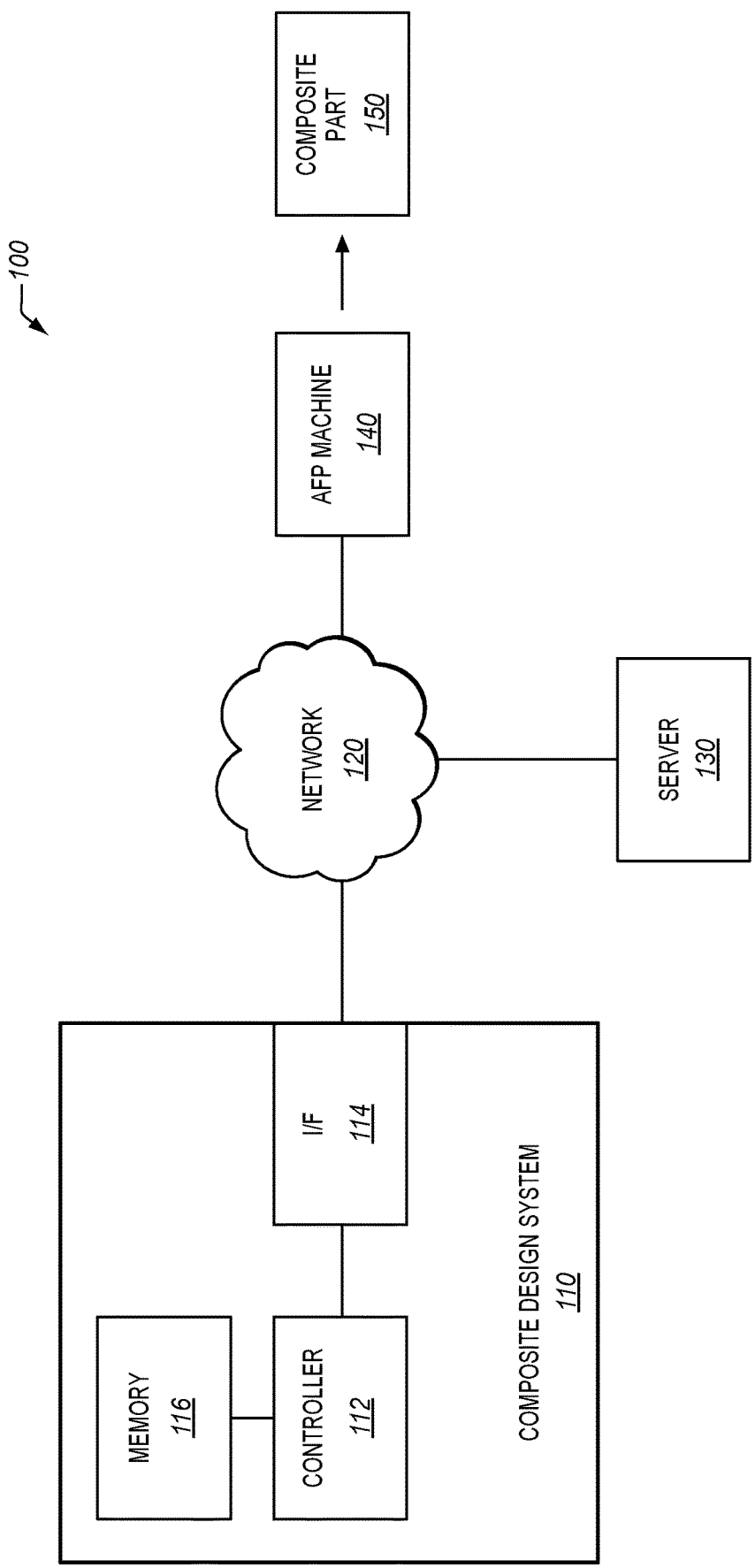
FIG. 1 is a block diagram of a composite manufacturing environment in an illustrative embodiment.

FIG. 1 is a block diagram of a composite manufacturing environment 100 in an illustrative embodiment. According to FIG. 1, composite manufacturing environment 100 includes composite design system 110, which is capable of designing a composite part 150. Composite design system 110 optimizes composite part 150 to conform with stacking sequence rules that ensure part 150 has desired strength. Composite design system 110 also ensures that composite part 150 is capable of being manufactured efficiently by AFP machine 140.

In this embodiment, composite design system 110 includes controller 112, interface (I/F) 114, and memory 116. Controller 112 utilizes I/F 114 to access rules constraining how composite part 150 may be constructed, information describing the geometry of composite part 150, and/or other information. I/F 114 may acquire this information from server 130 via network 120. Controller 112 also optimizes designs for composite part 150 to ensure that they will more efficiently utilize the time of AFP machine 140. In further embodiments, controller 112 may even generate the designs which it optimizes. These designs may be stored by controller 112 within memory 116. Controller 112 may be implemented, for example, as custom circuitry, as a processor executing programmed instructions, or some combination thereof. I/F 114 comprises any suitable combination of circuitry and/or components for transmitting data (e.g., via network 120). Memory 116 comprises any suitable data storage device such as a hard disk, flash memory, etc.

Further details of the operation of composite design system 110 will be described with regard to FIG. 6 below. However, FIGS. 2-5 are discussed before FIG. 6 in order to provide context illustrating an illustrative composite part that may be designed by composite design system 110, and to further illustrate functional components of composite design system 110.

Figure 2:
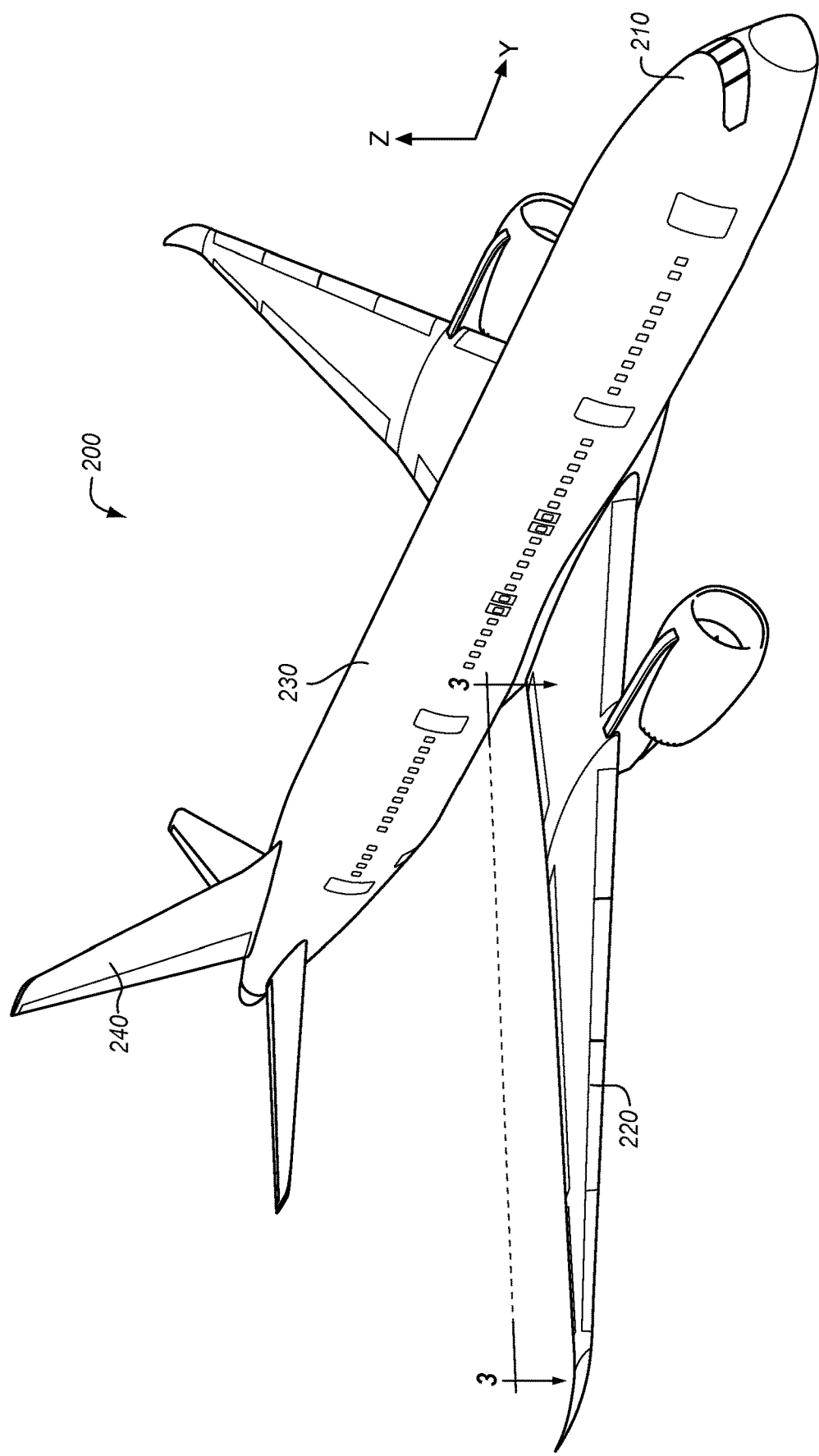
FIG. 2 is a diagram of an aircraft in an illustrative embodiment.

FIG. 2 is a diagram of an aircraft 200 in an illustrative embodiment. Aircraft 200 includes nose 210, wing 220, fuselage 230, and tail 240. Further discussion of aircraft 200 will focus on a multi-panel, multi-layer composite part for wing 220. However, similar techniques to those described herein may be applied to any suitable composite part.

Figure 3:
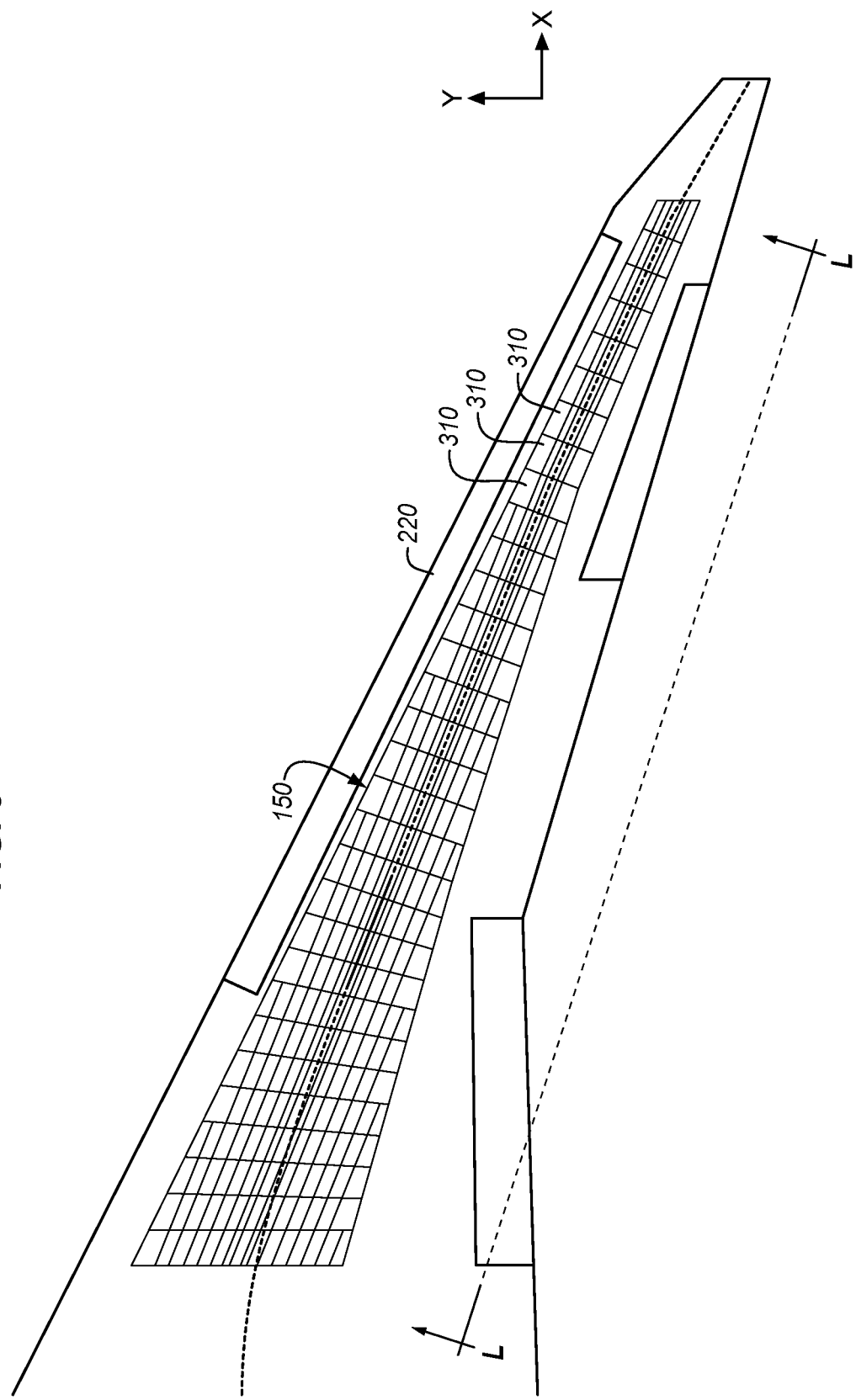
FIG. 3 is a diagram of a wing of an aircraft that includes a composite part divided into panels in an illustrative embodiment.

FIG. 3 is a diagram of a wing 220 of an aircraft that includes a composite part 150 divided into panels 310 in an illustrative embodiment. Specifically, composite part 150 comprises a portion of an upper wing skin. The view for FIG. 3 is shown by view arrows 3 of FIG. 2. As shown in this diagram, each panel 310 comprises a small portion of the area of composite part 150. View arrows L along FIG. 3 indicate a possible view along the length of wing 220. For composite part 150, the total number of plies per orientation may be predefined for each panel. As an alternative, an increase in plies per orientation may be allowed to help improve manufacturability.

Figure 4:
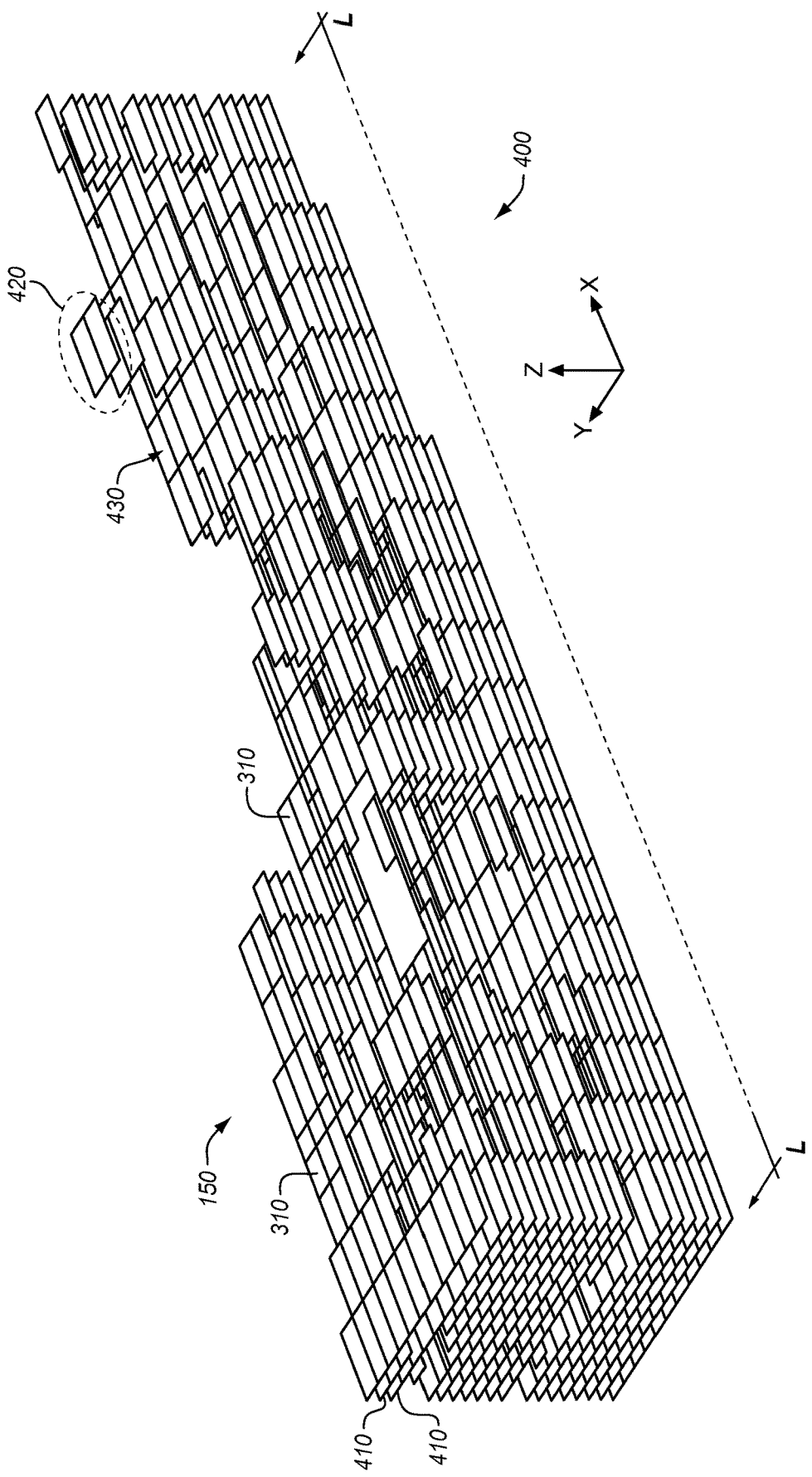
FIG. 4 is an exploded view of a laminate design for a portion of a part that includes multiple layers divided into panels in an illustrative embodiment.

FIG. 4 is an exploded view of a laminate design 400 for a portion of composite part 150 that includes multiple panels 310 divided into ply sequences 410 in an illustrative embodiment. FIG. 4 includes arrows for view L shown in FIG. 3, in order to indicate how FIG. 4 aligns with FIG. 3. FIG. 4 illustrates that composite part 150 includes multiple panels 310. Each panel 310 occupies a distinct surface location at composite part 150 (e.g., a distinct range of coordinates along X and Y). FIG. 4 also illustrates that each panel 310 includes some of ply sequences 410. Each ply sequence 410 occupies a distinct portion of laminate design 400 along Z in the exploded view (i.e., a different portion of a thickness of composite part 150). When laminate design 400 is manufactured the plies 420 in ply sequences 410 are consolidated, such that plies in the same sequence may end up at different Z locations through the thickness in the composite part 150 depending on surface location. Plies 420 that are laid-up at ply sequence 410 (i.e., the same Z coordinate in the exploded view in laminate design 400) will be laid up at the same fiber orientation by AFP machine 140 onto composite part 150, regardless of the panel 310 in which they are placed. Ply sequences 410 that are at different Z coordinates may be reserved for plies with different fiber orientations.

A ply sequence 410 may include material at panel 310, or a ply sequence may be empty, depending on the laminate design. A ply 420 is formed by a set of connected panels that all contain material in a ply sequence 410 that is the same. Each ply 420 has a shape, outlined by the outside boundaries of the panels contained in the ply. A ply sequence 410 can contain multiple plies, each having a shape.

Alternatively the word "ply" may be used to indicate the presence of material with a specific fiber orientation within a given panel 310 at a specific location through the thickness. A portion of a ply within a sequence is referred to as a partial ply 430. A number of rules/guidelines may be used to dictate how plies with different fiber orientations are stacked through the thickness for each panel 310 within composite part 150. The rules ensure that composite part 150 exhibits a desired strength and is capable of enduring stresses applied during its lifetime. These rules may be referred to as "stacking sequence rules."

Figure 5:
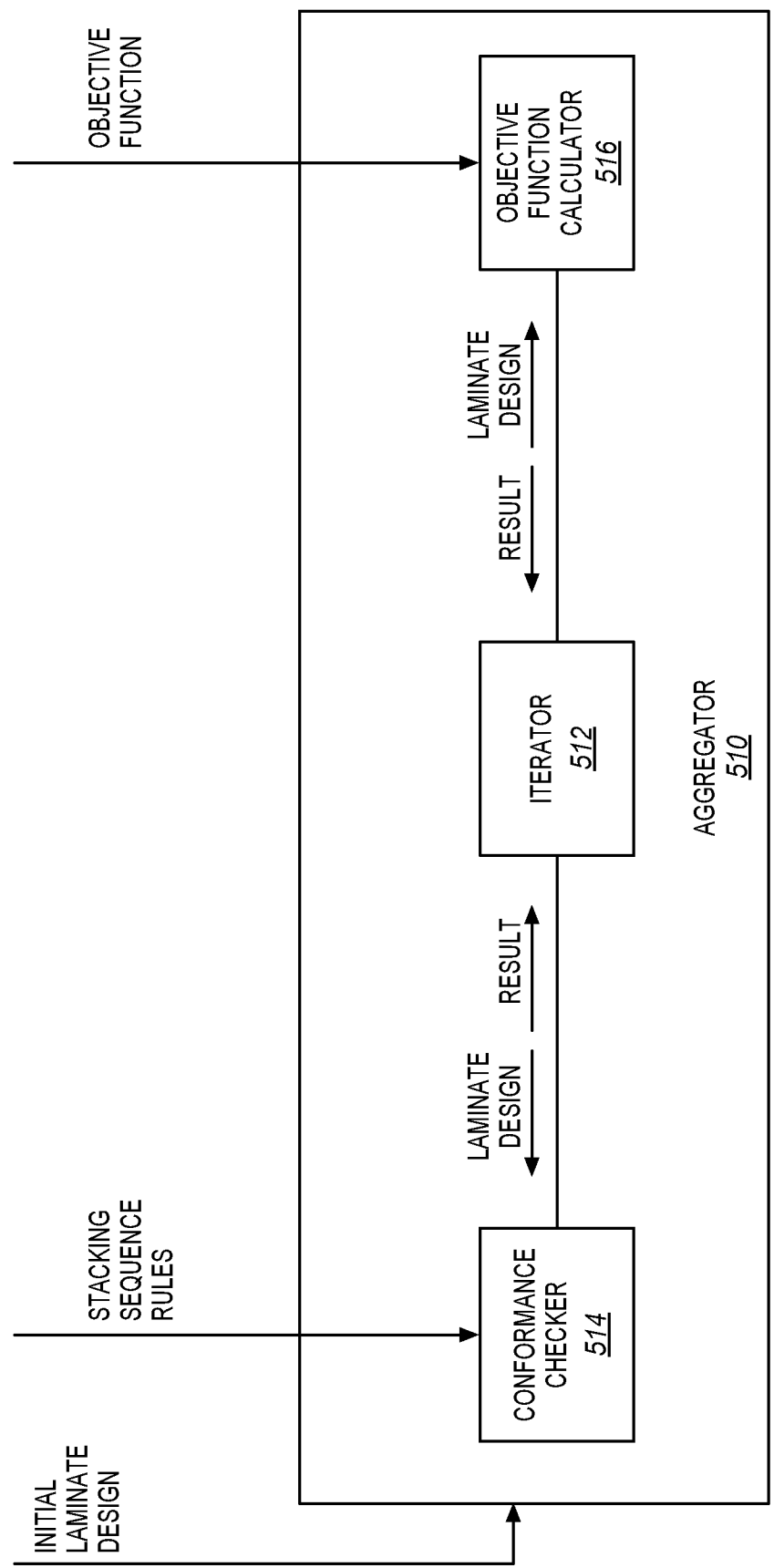
FIG. 5 is a block diagram illustrating functional components implemented by a controller of a composite design system in an illustrative embodiment.

FIG. 5 is a block diagram illustrating functional components implemented by a controller of a composite design system in an illustrative embodiment. Specifically, FIG. 5 illustrates an aggregator 510, which may be implemented by a processor interpreting instructions stored in memory at composite design system 110. According to FIG. 5, aggregator 510 receives an initial laminate design. An iterator 512 at aggregator 510 identifies ply sequences 410 that can be improved by moving partial plies 430 to or from other ply sequences 410 with the same fiber orientation. Iterator 512 then revises the laminate design to indicate that the move has occurred, and evaluates the revised laminate design with objective function calculator 516. Objective function calculator 516 loads an objective function and determines a cost for the revised laminate design based on the cost function. If the move increases a cost calculated by the objective function such that it is higher than for the prior version of the laminate design, then iterator 512 undoes the move. Otherwise, iterator 512 passes the revised laminate design to conformance checker 514. Conformance checker 514 loads stacking sequence rules, and determines whether the revised laminate design complies with the stacking sequence rules for each of the panels 310 that are affected. If the revised laminate design is compliant, iterator 512 keeps the change. Alternatively, if the revised laminate design is not compliant, iterator 512 undoes the change. In either case, iterator 512 also iterates to select a new change for the ply 420 or partial ply 430, or to identify new changes for new plies or partial plies. As a further alternative, objective function calculator 516 may take conformance to the stacking sequence rules into account by adding a penalty for rule violations, instead of strictly enforcing conformance to the rules.

Examples of objective functions include laying out course centerlines within the ply shapes for the appropriate fiber orientations and minimizing $\Sigma_i(L_{ref}-L_i)^p$, where $L_i$ is the length for each course, $L_{ref}$ is a reference length larger than any $L_i$ and p>1. A further example of an objective function is $C_1 \cdot \Sigma_i(A_{ref}-A_i)^p + C_2 \cdot \Sigma_i B_i + C_3 \cdot N_c + C_4 \cdot Nrvq$. $A_i$ is the area of a ply, $A_{ref}$ is a reference area larger than all $A_i$. B is the length of the ply boundaries where tows are cut or started. $N_C$ is the number of corners. $N_{rv}$ is the number of stacking sequence rule violations. $C_i$ are different weighting factors for the objective function components that attempt to: avoid very small plies, minimize the length of the ply boundaries that have tow starts/cuts, reduce the number of corners (if the fiber direction is not perpendicular to the ply boundaries) and minimize the number of rule violations. Where p>1 and q>1.

Illustrative details of the operation of composite design system 110 will be discussed with regard to FIG. 6. Assume, for this embodiment, that interface 114 has received a laminate design that defines an arrangement of plies 420 for composite part 150. The laminate design subdivides the composite part 150 into panels 310 that are positioned at distinct surface locations at the composite part 150. Each panel 310 includes plies 420 that are positioned at ply sequences 410 that are distinct through the depth of the composite part 150. The laminate design may have been optimized via integer programming, may have been only partially optimized using a global method, or may comprise a design that was prepared by hand. In some embodiments, controller 112 performs integer optimization of the laminate design before proceeding to the method of FIG. 6.

Figure 6:
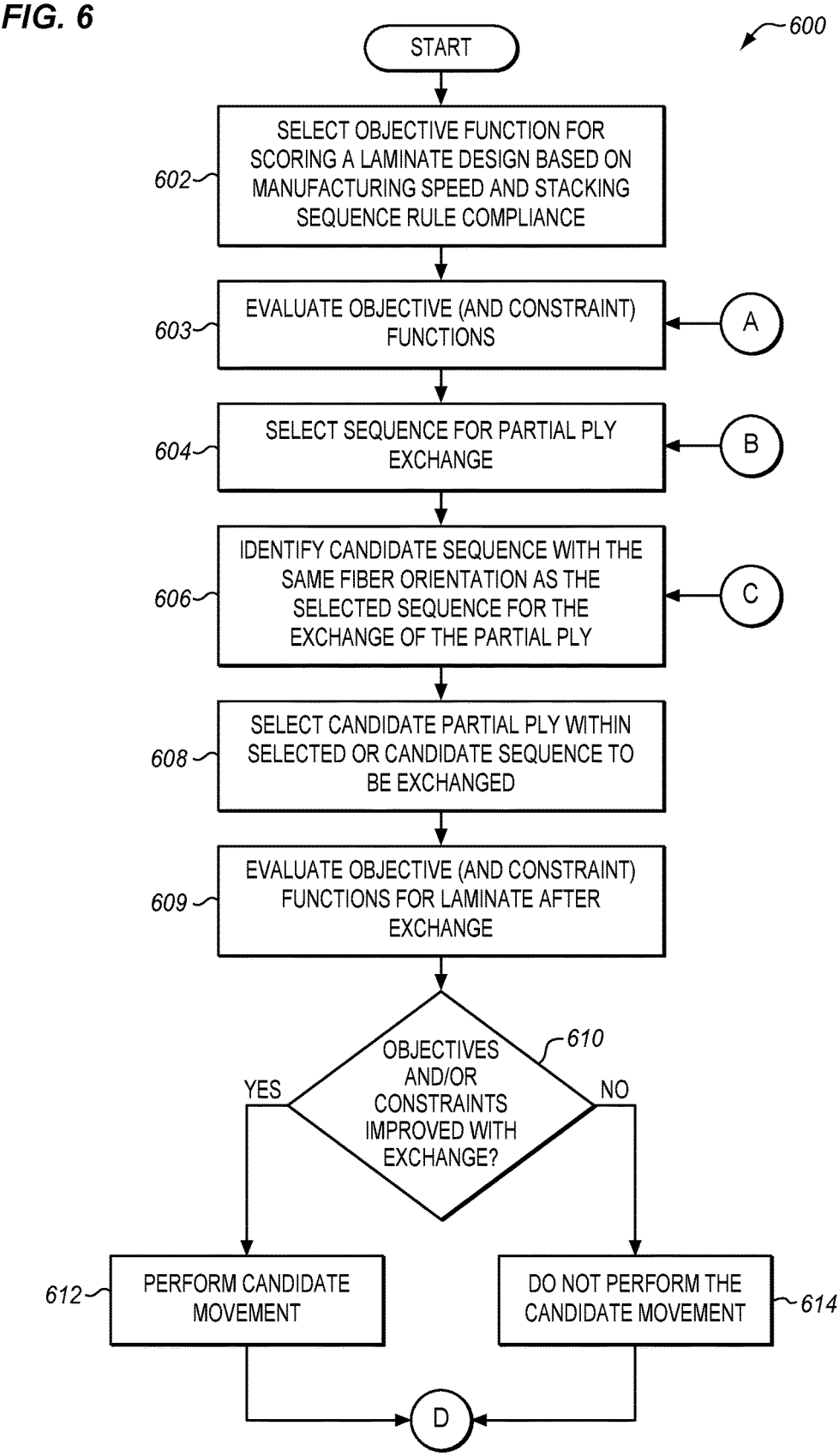
FIGS. 6-7 are flowcharts illustrating a method for ply shape optimization by moving partial plies between sequences in an illustrative embodiment.
Figure 7:
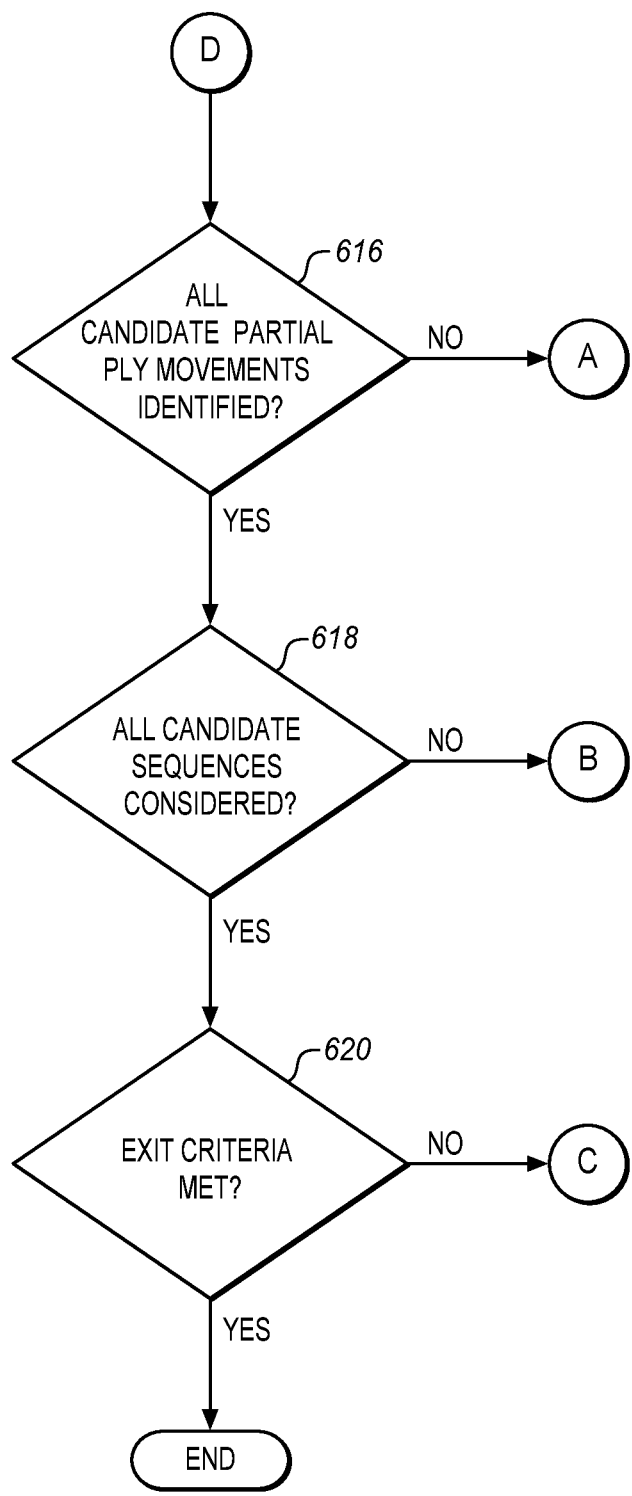

FIGS. 6-7 are flowcharts illustrating a method 600 for performing ply shape optimization by moving partial plies between sequences in an illustrative embodiment. The steps of method 600 are described with reference to composite design system 110 of FIG. 1, but those skilled in the art will appreciate that method 600 may be performed in other systems. The steps of the flowcharts described herein are not all inclusive and may include other steps not shown. The steps described herein may also be performed in an alternative order.

In step 602, controller 112 selects an objective function for scoring the laminate design. The objective function determines a cost/score based on criteria that indicate an expected manufacturing efficiency for the laminate design. Controller 112 may select from one of many objective functions stored in memory 116 depending on the type of part being considered or the type of fabrication being considered for the part. The objective function selected may utilize any desired criteria for enhancing manufacturability. For example, the objective function may include criteria that increase cost based on the sum of squared areas of ply sequences, and may use additional or alternative criteria such as corners, number of plies, or lengths of ply boundaries. If the laminate design was originally optimized using an objective function, the controller 112 may further evaluate the current laminate design via the same or a different objective function to determine a current cost of the laminate design. For example, there may be cases where objective functions may be swapped out in order to improve features related to local optimization, such as features that are not captured well via an integer approach (e.g., problematic ply shapes, very small ply shape areas, designs having many corners, etc.).

Controller 112 selects a ply sequence 410 for consideration in step 604. During the selection process, controller 112 may select a ply sequence 410 that has a highly negative (e.g., undesirable) contribution to the objective function, for example because it contains a very small ply that only covers a single panel. Controller 112 further identifies a ply sequence 410 (a "candidate" ply sequence) with the same fiber orientation that contains plies in panels adjacent to the problematic ply in the originally selected ply sequence 410 (step 606).

Controller 112 further identifies partial plies 430 in the selected sequence that can be moved to the candidate sequence, or plies 420 in the candidate ply sequence that can be moved to the selected sequence (in step 608). The results of the local optimization may vary depending on the choice of which partial plies to move. Different techniques may be used to select the partial plies 430 to be moved. For example, the controller may select the entire ply to be moved from the selected sequence to the candidate sequence if all of the panels covered by that ply are free in the candidate sequence. Alternatively, a partial ply 430 of the candidate sequence may be moved to the selected sequence to increase the size or improve the shape of ply 420 in the selected sequence. A ply 420 may cover a single panel or it may cover multiple connected panels.

Controller 112 proceeds with step 608 by evaluating an objective function and any applicable stacking sequence constraints for the proposed laminate design that results from making the (partial) ply exchange identified in step 606.

The controller 112 then compares the objective function and constraints of the candidate laminate design with those of the prior laminate design based on the values determined in step 603 and step 609. Controller 112 accepts the candidate laminate design if the ply exchange improves the objective function or increases compliance with the stacking sequence rules (i.e. constraints) with respect to the prior laminate design.

The controller 112 may determine whether the movement complies with the stacking sequence rules by loading the proposed laminate design, and reviewing the proposed laminate design for compliance on a rule-by-rule basis. In one embodiment, the stacking sequence rules dictate that no more than four adjacent plies through the thickness may have the same fiber orientation, that the laminate is symmetric with respect to the mid-plane, etc.

In further embodiments where the laminate design includes symmetry, controller 112 may identify changes to plies from one ply sequence to another, and reflect those changes to the ply sequences that represent the symmetric counterparts of the selected and candidate ply sequences in order to maintain symmetry.

Processing proceeds to step 616, where controller 112 determines whether all candidate movements have been identified for the ply (step 616). This may occur, for example, after controller 112 has evaluated the change to the objective function caused by a partial ply exchange between the selected ply sequence and the candidate ply sequence. If not all candidate movements have been identified, controller 112 returns to step 608. Alternatively, if all candidate movements have already been identified for the ply sequence 410, then controller 112 determines whether all ply sequences 410 in the laminate design have been considered (step 618). If not all ply sequences 410 have been considered as a candidate sequence, then controller 112 selects a new ply sequence in step 606. Otherwise, controller 112 selects an entirely new ply sequence in step 604. In this manner, controller 112 may iterate across the entirety of the composite design in order to identify local improvements in the locations of plies, on a sequence-by-sequence basis.

The iterations may be stopped based on meeting one of the exit criteria. These exit criteria may include, but are not limited to one of the following: maximum number of iterations reached; improvement in objective value below a selected threshold; maximum time reached.

The method of FIG. 6 provides a substantial benefit because it enables solutions which are globally optimized or only partially optimized via a global method (e.g., via deterministic methods such as integer programming techniques) to be refined and enhanced based on local optimization techniques that consider complex objective functions not feasible for global optimization. Thus, if a stacking sequence has been globally optimized or only partially optimized and has converged on a solution which is close to, but not actually at a minimum cost of an objective function, the local optimization techniques described herein may help to adjust the stacking sequence into a more optimal configuration.

Figure 8:
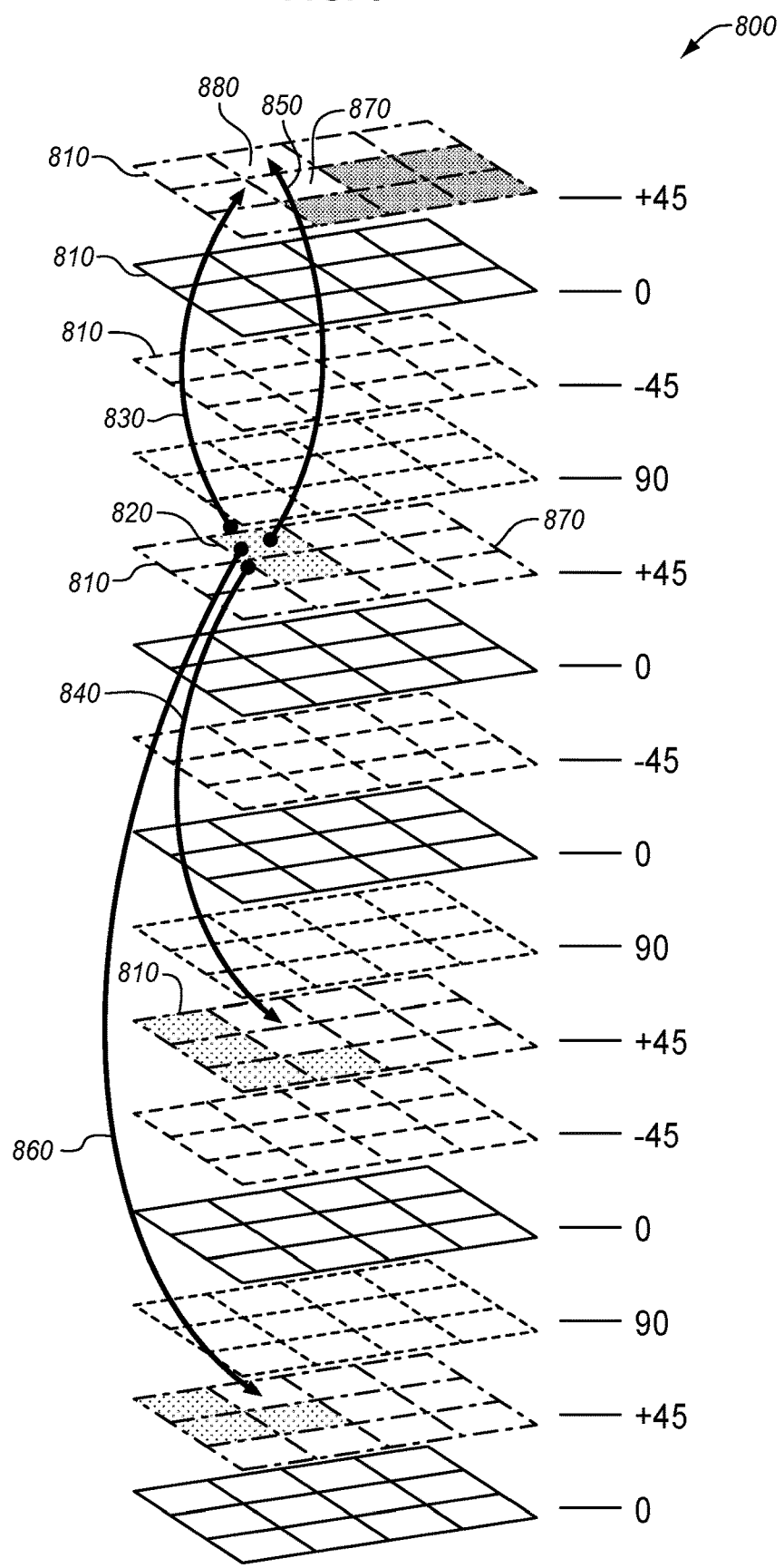
FIG. 8 is a perspective view of a ply being moved to an empty sequence in an illustrative embodiment.

FIG. 8 is a perspective view of a ply 820 being moved to an empty position in ply sequence 810 within a laminate design 800 in an illustrative embodiment. In FIG. 8 different ply sequences have different ply orientations. Ply 820 is in a ply sequence with a +45 degree fiber orientation. Thus, the entirety of ply 820 may be moved to candidate ply sequence 810 above via arrow 830, or may be moved to candidate ply sequence 810 below via arrow 840, because both candidate ply sequences have the same fiber orientation and empty spaces. Alternatively, a part of ply 820, covering panel 870, may be moved up along arrow 850, while another part of ply 820, covering panel 880, may be moved down along arrow 860. In the present embodiment, splitting up ply 820 in two partial plies and moving them according to arrow 850 and arrow 860 provides the greatest improvement to the objective function if it is based on manufacturing efficiency alone. Thus, ply 820 is split up and partial plies are moved along arrows 850 and 860 if these moves do not cause any violation of the stacking sequence rules (not shown here), and the laminate design is updated. If the moves do result in a violation of the stacking sequence rules one of the other moves may be considered. Alternatively, a (partial) ply may be moved in the reverse direction of arrow 840 to be joined with ply 820. This process may be performed multiple times for ply 820 or for other plies in other ply sequences within laminate design 800.

Figure 9:
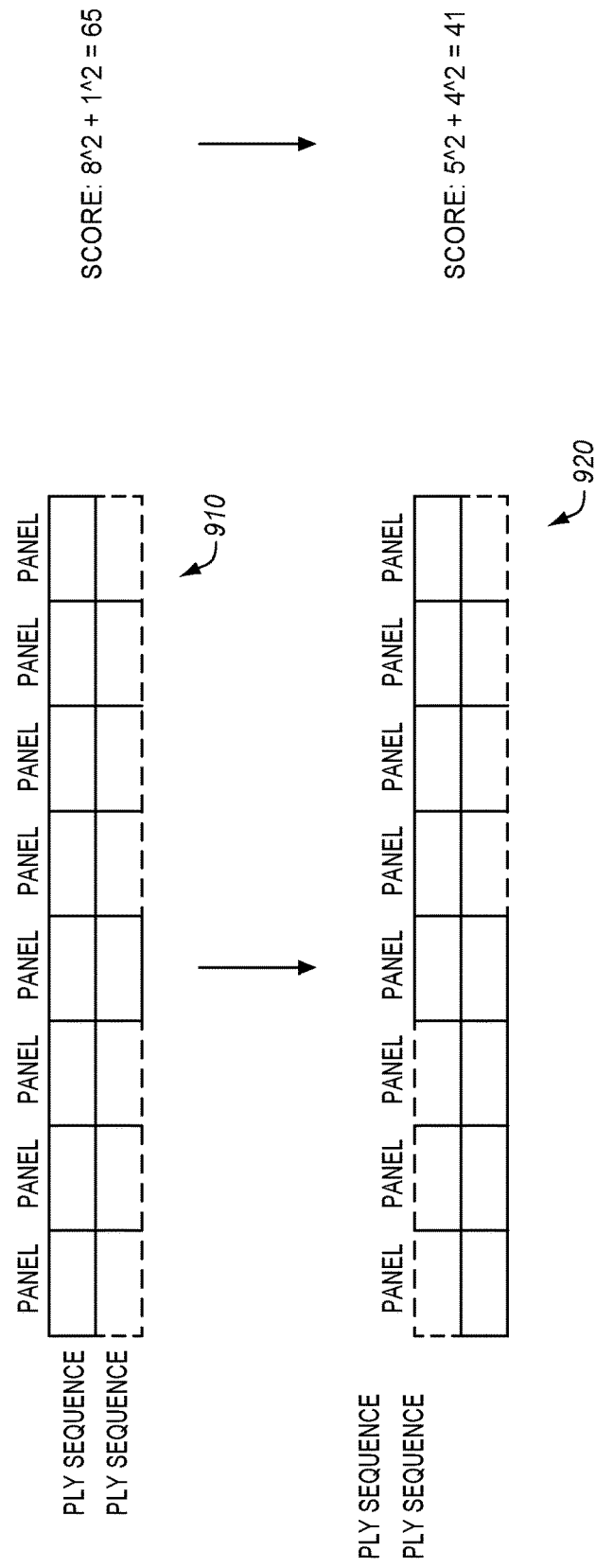
FIG. 9 is a block diagram illustrating changes to plies that reduce the cost calculated by an objective function in an illustrative embodiment.

FIG. 9 is a block diagram illustrating changes to plies that reduce the cost calculated by an objective function in an illustrative embodiment that aim to avoid very short plies. According to FIG. 9, a first version of a laminate design 910 includes eight panels. Plies are indicated by solid lines, while empty ply positions 870 are indicated by dashed lines. A ply in an upper ply sequence covers every panel, while a ply in a lower ply sequence covers only one of the panels. Because the objective function determines cost as the sum of squared lengths of the plies, the resulting cost of laminate design 910 is eight squared plus one squared (i.e., sixty-five). Stacking sequence 920 has been locally optimized on a panel-by-panel basis, resulting in an upper ply sequence having five plies, and a lower ply sequence having four plies. The cost of stacking sequence 920 is five squared plus four squared (i.e., forty-one). Hence, the cost of stacking sequence 920 is reduced with respect to laminate design 910 and a small ply has been avoided.

EXAMPLES

In the following examples, additional processes, systems, and methods are described in the context of a composite design system.

Figure 10:
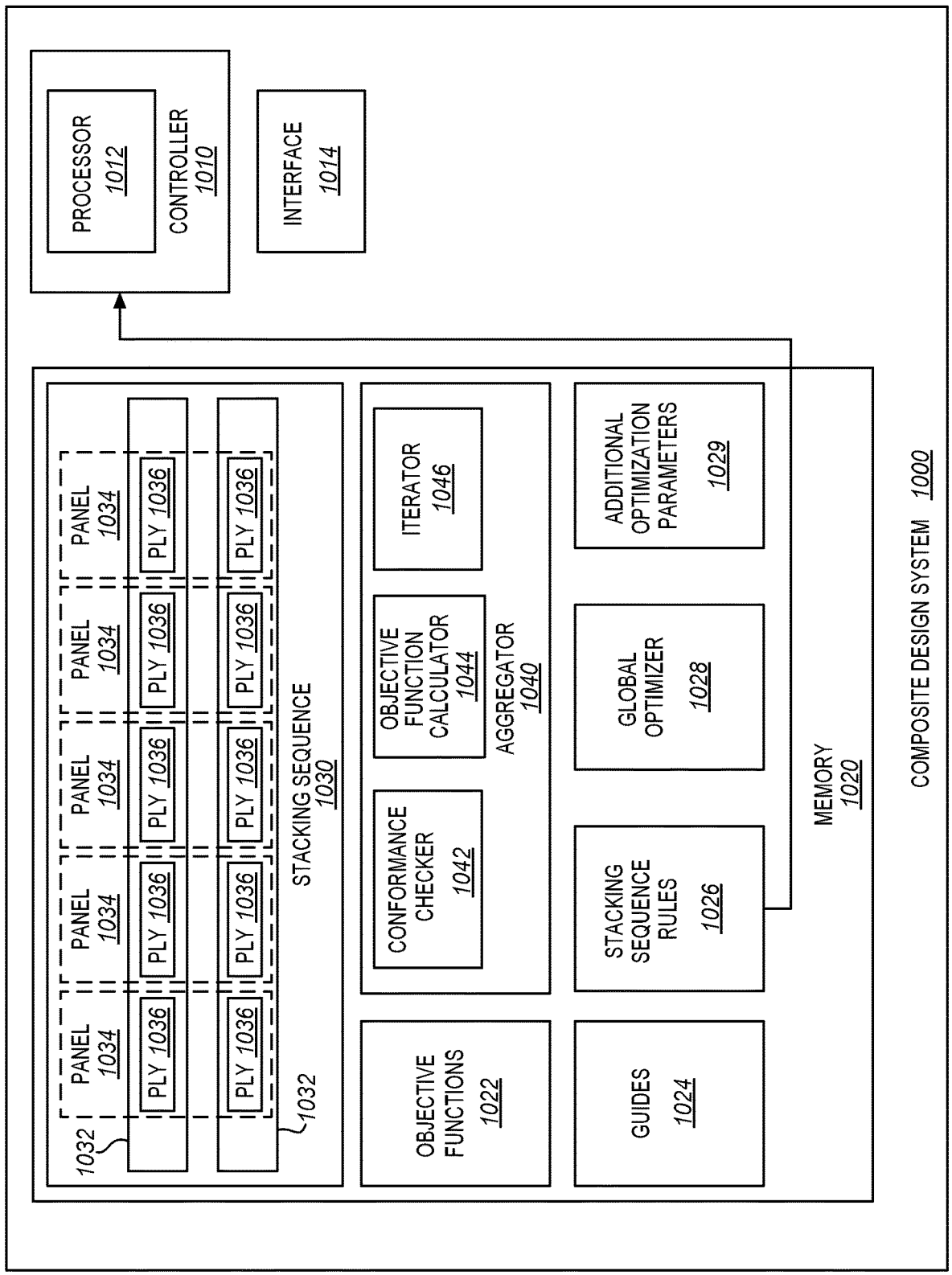
FIG. 10 is a block diagram of a composite design system in an illustrative embodiment.

FIG. 10 is a block diagram of a composite design system 1000 in an illustrative embodiment. According to FIG. 10, composite design system includes interface 1014 which exchanges data with an external computing device or network. For example, interface 1014 may comprise an Ethernet interface, a wireless interface compliant with IEEE 802.11 protocols, etc. Composite design system 1000 further includes controller 1010, which includes processor 1012 (i.e., a hardware device) that performs operations based on instructions stored in memory 1020. Memory 1020 includes aggregator 1040, which itself includes iterator 1046, objective function calculator 1044, and conformance checker 1042. These components work together in order to determine how an input stacking sequence may be revised in order to ensure better manufacturability.

Memory 1020 further stores objective functions 1022, stacking sequence rules 1026, and additional optimization parameters 1029. Additional optimization parameters 1029 may indicate, for example, how long to perform optimization at composite design system 1000. In this embodiment, memory 1020 further includes guides 1024, which reserve a fiber orientation for each layer, and global optimizer 1028, which is utilized to initially generate stacking sequence 1030. Stacking sequence 1030 includes multiple layers 1032, and multiple panels 1034. Stacking sequence 1030 further includes plies 1036 at specific one of layers 1032 within panels 1034.

Memory 1020 comprises any suitable component operable for storing digital data. For example, memory 1020 may comprise Random Access Memory (RAM), a hard disk, an optical storage media, flash memory, etc.

Figure 11:
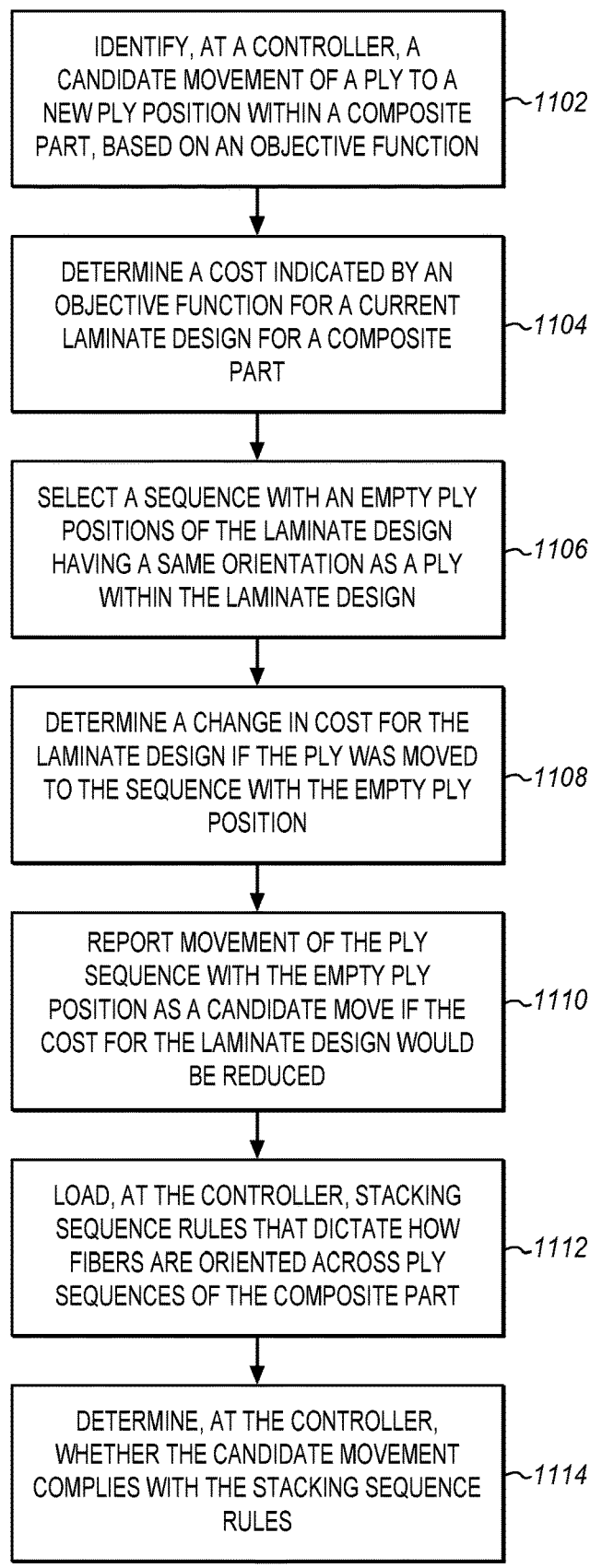
FIG. 11 is an additional flowchart illustrating a method for ply shape optimization by moving partial plies between sequences in an illustrative embodiment.

FIG. 11 is an additional flowchart illustrating a method 1100 for ply shape optimization by moving partial plies between sequences in an illustrative embodiment. According to FIG. 11, in step 1102 a controller identifies candidate movement of a ply to a new ply position within a composite part, based on an objective function. In step 1104 the controller determines a cost indicated by an objective function for a current laminate design for a composite part. In step 1106 the controller selects a sequence with an empty ply position of the laminate design having a same orientation as a ply within the laminate design. In step 1108 the controller determines a change in cost for the laminate design if the ply was moved to the sequence with the empty ply position. In step 1110 the controller reports movement of the ply to the sequence with the empty ply position as a candidate move if the cost for the laminate design would be reduced. In step 1112 the controller loads stacking sequence rules that dictate how fibers are oriented across ply sequences of the composite part. In step 1114 the controller determines whether the candidate movement complies with the stacking sequence rules.

Figure 12:
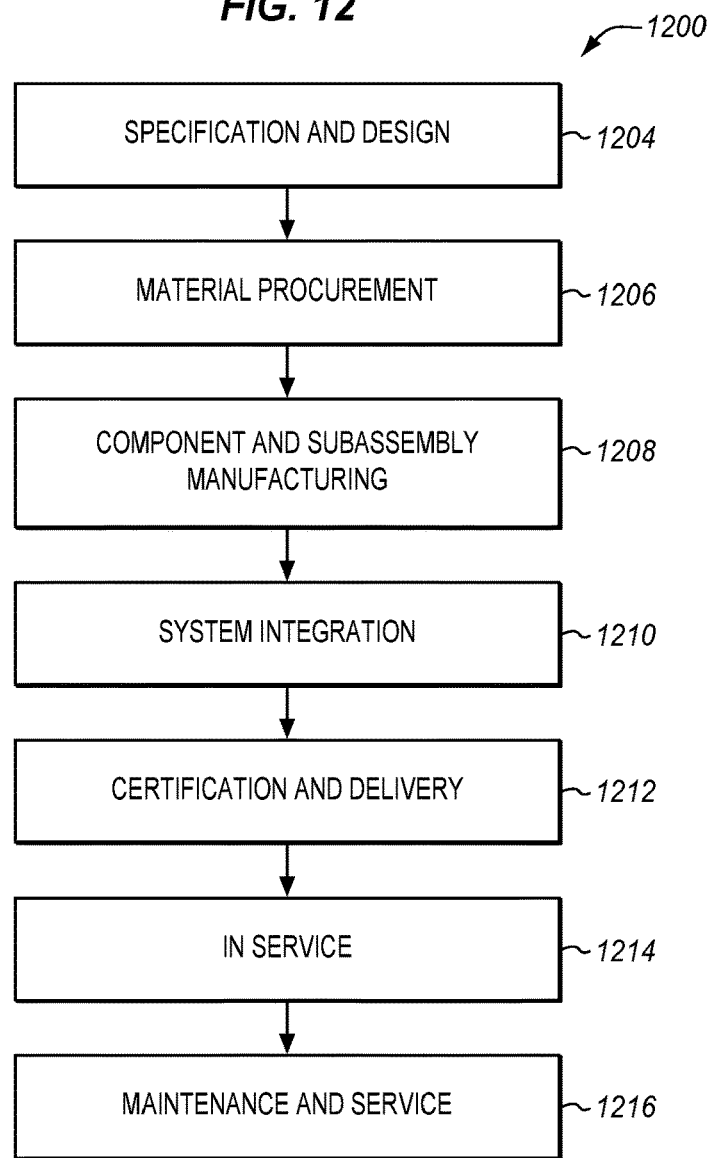
FIG. 12 is a flow diagram of aircraft production and service methodology in an illustrative embodiment.
Figure 13:
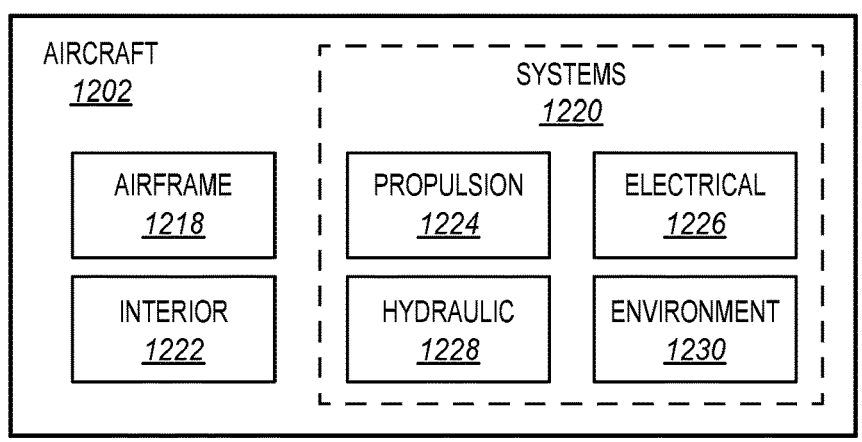
FIG. 13 is a block diagram of an aircraft in an illustrative embodiment.

Referring more particularly to the drawings, embodiments of the disclosure may be described in the context of an aircraft manufacturing and service method 1200 as shown in FIG. 12 and an aircraft 1202 as shown in FIG. 13. During pre-production, illustrative method 1200 may include specification and design 1204 of the aircraft 1202 and material procurement 1206. During production, component and subassembly manufacturing 1208 and system integration 1210 of the aircraft 1202 takes place. Thereafter, the aircraft 1202 may go through certification and delivery 1212 in order to be placed in service 1214. While in service by a customer, the aircraft 1202 is scheduled for routine maintenance and service 1216 (which may also include modification, reconfiguration, refurbishment, and so on). Apparatus and methods embodied herein may be employed during any one or more suitable stages of the production and service method 1200 (e.g., specification and design 1204, material procurement 1206, component and subassembly manufacturing 1208, system integration 1210, certification and delivery 1212, service 1214, maintenance and service 1216) and/or any suitable component of aircraft 1202 (e.g., airframe 1218, systems 1220, interior 1222, propulsion 1224, electrical 1226, hydraulic 1228, environmental 1230).

Each of the processes of method 1200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 13, the aircraft 1202 produced by illustrative method 1200 may include an airframe 1218 with a plurality of systems 1220 and an interior 1222. Examples of high-level systems 1220 include one or more of a propulsion system 1224, an electrical system 1226, a hydraulic system 1228, and an environmental system 1230. Any number of other systems may be included. Although an aerospace example is shown, the principles of the invention may be applied to other industries, such as the automotive industry.

As already mentioned above, apparatus and methods embodied herein may be employed during any one or more of the stages of the production and service method 1200. For example, components or subassemblies corresponding to production stage 1208 may be fabricated or manufactured in a manner similar to components or subassemblies produced while the aircraft 1202 is in service. Also, one or more apparatus embodiments, method embodiments, or a combination thereof may be utilized during the production stages 1208 and 1210, for example, by substantially expediting assembly of or reducing the cost of an aircraft 1202. Similarly, one or more of apparatus embodiments, method embodiments, or a combination thereof may be utilized while the aircraft 1202 is in service, for example and without limitation, to maintenance and service 1216. For example, the techniques and systems described herein may be used for steps 1206, 1208, 1210, 1214, and/or 1216, and/or may be used for airframe 1218 and/or interior 1222. These techniques and systems may even be utilized for systems 1220, including for example propulsion 1224, electrical 1226, hydraulic 1228, and/or environmental 1230.

In one embodiment, a part comprises a portion of airframe 1218 that is designed in specification and design 1204, and is manufactured during component and subassembly manufacturing 1208. The part may then be assembled into an aircraft in system integration 1210, and then be utilized in service 1214 until wear renders the part unusable. Then, in maintenance and service 1216, the part may be discarded and replaced with a newly manufactured part. Inventive components and methods may be utilized throughout specification and design 1204 in order to generate designs for the part that are easier to fabricate.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method comprising:
generating a laminate design by performing integer programming;
identifying, at a controller, a candidate movement of a ply in the laminate design to a new ply position within a composite part, based on an objective function, by:
determining a fiber orientation of the ply; and
determining that the new ply position is currently unoccupied by any ply of any fiber orientation and is within a ply sequence reserved for only the fiber orientation of the ply that is subject to the candidate movement, wherein the ply sequences are reserved for distinct fiber orientations;
loading, at the controller, stacking sequence rules that dictate how fibers are oriented across ply sequences of the composite part; and
determining, at the controller, whether the candidate movement complies with the stacking sequence rules.

2. The method of claim 1 further comprising:
receiving, at the controller, the laminate design, wherein the laminate design defines an arrangement of plies for the composite part, the laminate design subdividing the composite part into panels that are positioned at distinct surface locations at the composite part, each panel including layers that are positioned at distinct depths at the composite part;

selecting, at the controller, the objective function, wherein the objective function is for scoring the laminate design and is based on manufacturing speed for the laminate design;
performing the candidate movement when the candidate movement complies with the stacking sequence rules; and
preventing the candidate movement when the candidate movement violates the stacking sequence rules.

3. The method of claim 1 wherein:
the objective function is different from another objective function utilized during the integer programming.

4. The method of claim 1 wherein:
identifying a candidate movement is performed for each ply of each ply sequence.

5. The method of claim 1 wherein:
the objective function is $\Sigma_i(L_{ref}-L_i)^p$, where $L_i$ is a length for each course, $L_{ref}$ is a reference length larger than any $L_i$ and $p>1$.

6. The method of claim 1 wherein:
identifying the candidate movement comprises:
   determining whether a movement of the ply will cause a cost of the objective function to be reduced;
   marking the movement of the ply as the candidate movement when the movement reduces the cost of the objective function; and
   selecting another movement of the ply when the movement does not reduce the cost of the objective function.

7. The method of claim 1 wherein:
ply sequences each comprise a combination of plies that are physically laid for a same layer across all panels; and
the objective function determines cost based on a sum of squares of ply sequence lengths within the laminate design.

8. The method of claim 1 wherein:
plies each comprise a contiguous combination of plies across one or more panels in a same layer; and
the objective function increases cost for each ply that occupies only one panel.

9. A portion of an aircraft assembled according to the method of claim 1.

10. A method comprising:
generating a laminate design by performing integer programming;
determining a cost indicated by an objective function for a current laminate design for a composite part;
selecting a sequence with an empty ply position of the laminate design having a same orientation as a ply within the laminate design, wherein the empty ply position is currently unoccupied by any ply of any fiber orientation and is within a ply sequence reserved for only the fiber orientation of the ply, and wherein the ply sequences are reserved for distinct fiber orientations;
determining a change in cost for the laminate design if the ply was moved to the sequence with the empty ply position; and
reporting movement of the ply to the sequence with the empty ply position as a candidate move if the cost for the laminate design would be reduced.

11. The method of claim 10 further comprising:
determining whether the sequence with the empty ply position is a last sequence; and
if the sequence with the empty ply position is not the last sequence with an empty ply position, selecting another sequence with an empty ply position.

12. The method of claim 10 wherein:
determining the change in cost is performed based on the objective function.

13. A portion of an aircraft assembled according to the method of claim 10.

14. A non-transitory computer readable medium embodying programmed instructions which, when executed by a processor, are operable for performing a method comprising:
generating a laminate design by performing integer programming;
determining a cost indicated by an objective function for a current laminate design for a composite part;
selecting a sequence with an empty ply position of the laminate design having a same orientation as a ply within the laminate design, wherein the empty ply position is currently unoccupied by any ply of any fiber orientation and is within a ply sequence reserved for only the fiber orientation of the ply, and wherein the ply sequences are reserved for distinct fiber orientations;
determining a change in cost for the laminate design if the ply was moved to the sequence with the empty ply position; and
reporting movement of the ply to the sequence with the empty ply position as a candidate move if the cost for the laminate design would be reduced.

15. The medium of claim 14 wherein the method further comprises:
receiving, at the controller, the laminate design, wherein the laminate design defines an arrangement of plies for the composite part, the laminate design subdividing the composite part into panels that are positioned at distinct surface locations at the composite part, each panel including layers that are positioned at distinct depths at the composite part;
selecting, at the controller, the objective function, wherein the objective function is for scoring the laminate design that is based on manufacturing speed for the laminate design;
performing the candidate movement when the candidate movement complies with the stacking sequence rules; and
preventing the candidate movement when the candidate movement violates the stacking sequence rules.

16. The medium of claim 14 wherein:
the objective function is different from another objective function utilized during the integer programming.

17. The medium of claim 14 wherein:
identifying a candidate movement is performed for each ply of each ply sequence.

18. The method of claim 1 wherein:
the objective function is $\Sigma_i(L_{ref}-L_i)^p$, where $L_i$ is a length for each course, $L_{ref}$ is a reference length larger than any $L_i$ and $p>1$.

19. The medium of claim 14 wherein:
identifying the candidate movement comprises:
   determining whether a movement of the ply will cause a cost of the objective function to be reduced;
   marking the movement of the ply as the candidate movement when the movement reduces the cost of the objective function; and
   selecting another movement of the ply when the movement does not reduce the cost of the objective function.

20. The method of claim 14 wherein:
ply sequences each comprise a combination of plies that are physically laid for a same layer across all panels; and the objective function determines cost based on a sum of squares of ply sequence lengths within the laminate design.

21. The method of claim 14 wherein:
plies each comprise a contiguous combination of plies across one or more panels in a same layer; and
the objective function increases cost for each ply that occupies only one panel.

22. A portion of an aircraft assembled according to the method implemented by the computer readable medium of claim 14.

23. A system comprising:
an interface that receives a laminate design, generated via integer programming, that defines an arrangement of plies for a composite part, the laminate design subdividing the composite part into panels that are positioned at distinct surface locations at the composite part, each panel including layers that are positioned at distinct depths at the composite part; and
a controller that selects an objective function for scoring the laminate design that is based on manufacturing speed for the laminate design, selects a ply located at a ply position in the laminate design, each ply position in the laminate design occupying a ply sequence, and identifies a candidate movement of the ply to a new ply position, based on the objective function, by: determining a fiber orientation of the ply, and determining that the new ply position is currently unoccupied by any ply of any fiber orientation and is within a ply sequence reserved for only the fiber orientation of the ply that is subject to the candidate movement, wherein the ply sequences are reserved for distinct fiber orientations, the controller loads stacking sequence rules that dictate how fibers are oriented across the ply sequences of the composite part, determines whether the candidate movement complies with the stacking sequence rules, performs the candidate movement to modify the laminate design when the candidate movement complies with the stacking sequence rules, and prevents the candidate movement when the candidate movement violates the stacking sequence rules.

24. The system of claim 23 wherein:
the ply sequences are reserved for distinct fiber orientations, and
the controller identifies the candidate movement by determining a fiber orientation of the ply, and determining that the new ply position is currently unoccupied by a ply and is reserved for the fiber orientation.

25. The system of claim 23 wherein:
the controller identifies a candidate movement for each ply of each ply sequence.

26. The method of claim 23 wherein:
the objective function is $\Sigma_i(L_{ref}-L_i)^p$, where $L_i$ is a length for each course, $L_{ref}$ is a reference length larger than any $L_i$ and $p>1$.

27. Fabricating a portion of an aircraft based on the laminate design modified by the system of claim 23.

* * * * *